United States Patent Office 3,352,784
Patented Nov. 14, 1967

3,352,784
FIRE RESISTANT HYDRAULIC FLUID AND LUBRICANT COMPOSITION
Donald H. Nail, Los Angeles, Calif., assignor, by mesne assignments, to McDonnell Douglas Corporation, Santa Monica, Calif., a corporation of Maryland
No Drawing. Filed Nov. 4, 1964, Ser. No. 408,753
10 Claims. (Cl. 252—78)

This invention relates to new and improved compositions particularly useful as fire resistant hydraulic fluids and lubricants of high thermal stability and good lubricity and having improved low temperature characteristics, for example, as regards viscosity and cloud point.

Various fluids have been developed heretofore having various combinations of properties required for hydraulic fluids employed for a variety of purposes. However, for many purposes highly fire resistant hydraulic fluids and lubricants are required. Thus, for example, fire resistant and explosion resistant fluids are particularly useful in high pressure systems such as in the hydraulic systems of die casting machines, hydro electric turbines, hydraulic presses, and the like, which would result in fire and explosion from leaking hydraulic fluids in the event such fluids are not adequately fire resistant.

In U.S. Patent 3,136,726 there is described a fire resistant hydraulic fluid and lubricant comprising a mixture of certain phosphate esters, e.g., a triaryl phosphate such as tricresyl phosphate, and a chlorinated biphenyl, and which may also contain viscosity improvers such as a polyalkyl methacrylate. Although these mixtures provide excellent fire resistant and explosion proof hydraulic fluids and lubricants, they have limited application at temperatures of the order of about 0° F. and below, because of their relatively high viscosity characteristics and tendency to crystallize out or form solids at such reduced temperatures.

It is accordingly an object of the invention to provide improved compositions useful as general industrial hydraulic fluids and lubricants, and for other applications, such compositions having high fire resistance, high thermal stability, good lubricating properties, and which are useful over a wide temperature range and particularly having improved low temperature characteristics including lower viscosity and lower cloud and pour point, e.g., as compared to the hydraulic fluids of the prior art and the above-noted patent, and particularly enabling such compositions and fluids to be employed at reduced temperatures e.g., of the order of 0° F. and below.

Other objects and advantages of the invention will appear hereinafter.

It has now been found that mixtures of certain phosphate esters, e.g., triaryl phosphate such as tricresyl phosphate, with chlorinated diphenyl ethers, preferably in certain proportions noted below, provide highly improved fire resistant compositions particularly useful as hydraulic fluids and lubricants, which have good lubricity over a wide range of applied loads, good pump life when employed in a hydraulic system, good physical and chemical stability, good thermal and hydrolytic stability and non-corrosiveness, and particularly, have improved low temperature characteristics including low viscosity at low temperatures of the order of 0° F. and below, and low pour point and cloud point, permitting the composition to remain liquid at such low temperatures and substantially without crystallization of solids therefrom at such temperatures. To such mixture of phosphate ester and chlorinated diphenyl ether there can be added optionally and in some instances, preferably, minor amounts of suitable viscosity improvers such as polyalkyl methacrylates, and also inhibitors, as well as additives to enhance lubricity.

One of the two essential components of the invention composition are the phosphates. Phosphate esters suitable for use in the invention are the triaryl phosphates, diarylalkyl phosphates and dialkylaryl phosphates. Such phosphate esters have the general formula

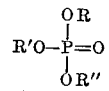

wherein R is a radical selected from the group consisting of phenyl, cresyl and xylyl, and R' and R'' are radicals selected from the group consisting of phenyl, cresyl, xylyl, and an alkyl radical of from about 4 to about 12 carbon atoms, preferably from about 4 to about 10 carbon atoms. Thus, such alkyl groups can be straight or branched chain alkyls, e.g., butyl, isobutyl, pentyl, hexyl, 2-ethyl butyl, 2-ethyl hexyl, n-octyl, nonyl, decyl, and the like. Suitable phosphate esters according to the invention are, for example, tricresyl phosphate, cresyl diphenyl phosphate, triphenyl phosphate, dihexyl phenyl phosphate, butyl diphenyl phosphate, butyl-2-ethylhexy phenyl phosphate, di-(2-ethylhexyl)phenyl phosphate, and the like. Tricresyl phosphate and cresyl diphenyl phosphate are preferred.

Suitable chlorinated diphenyl ethers which can be employed as the second essential component of the invention composition or fluid can include from about 1 to about 10 chlorine atoms in the molecule, generally from about 1 to about 6 chlorine atoms per molecule. In each instance, the mono-, di-, tri-, tetra-, penta-, and hexa-chloro derivatives of the diphenyl ether according to the invention, consist primarily or substantially entirely of substitution chlorine on the aromatic rings, rather than addition chlorine, and in each case the ether used can be either a particularly selected isomer or compound, or mixture of isomers, or an unresolved mixture of isomers or mixture of chlorinated diphenyl ethers of varying numbers of chlorine atoms in the molecule. Such mixtures of chlorinated diphenyl ethers are obtained from the reaction of chlorine with diphenyl ether, e.g., as described in U.S. Patents 2,022,634 and 2,165,813.

Compositions of the invention particularly having reduced viscosity are prepared employing chlorinated diphenyl ethers preferably having from about 1 to about 4 chlorine atoms per molecule. In some instances where it is particularly desired to provide compositions according to the invention which are useful as low viscosity coolants, such compositions are prepared using as a chlorinated diphenyl ether component a mixture which can also include, for example, some unchlorinated diphenyl ether as well as, for example, monochloro and dichloro diphenyl ethers. For general purpose wide utility, mixtures of chlorinated diphenyl ethers averaging, for example, about 4 chlorine atoms per molecule can be employed. Thus, for example, the term "tetrachloro diphenyl ether" employed herein refers to either the specific tetrachlorinated derivative or a mixture of chlorinated diphenyl ethers which averages approximately 4 chlorine atoms per molecule and consisting of mixtures of the various isomer molecules chlorinated to varying degrees.

The combined chlorine content of the preferred chlorinated diphenyl ethers employed in the invention composition can range from about 15 to about 59% by weight, encompassing such ethers which contain from about 1 to about 6 chlorine atoms. The combined chlorine content of the mixture of chlorinated diphenyl ethers containing an average of about 4 chlorine atoms per molecule can range from about 45 to about 50% by weight.

The proportion of phosphate ester to chlorinated diphenyl ether employed in the invention composition can vary broadly, e.g., over a range of about 10% to about 90% of phosphate ester and about 10% to about 90% of the chlorinated diphenyl ether, by weight. A preferred range is from about 10% to about 70% phosphate ester and about 30% to about 90% chlorinated diphenyl ether, by weight.

Although the otherwise unsubstituted phosphate esters described above are preferred for use in the invention composition, substituted triaryl, alkyl diaryl and dialkylaryl phosphate esters, e.g., chlorine substituted phosphate esters of this type, can also be employed and are included within the definition of the suitable phosphate esters set forth above. Thus, for example, R in the formula above includes chlorophenyl, e.g., o-, p- or m-chlorophenyl. Likewise, while the otherwise unsubstituted chlorinated diphenyl ethers described above are preferred for purposes of the invention, certain substituted ethers of this type, e.g., alkyl substituted, such as methyl-, ethyl-, or propyl-substituted, chlorodiphenyl ethers, may also be employed.

The mixtures or blends of phosphate ester and chlorinated diphenyl ether according to the invention have distinct advantages over either component employed separately. Thus, a blend or mixture of 50% tetrachlorodiphenyl ether with 50% tricresyl phosphate, for example, remains liquid at relatively low temperature with a pour point of about 15° F., whereas the tetrachloro diphenyl ether is a mushy solid at about 70° F. and above. Also, a blend of 50% trichloro diphenyl ether with 50% tricresyl phosphate, has markedly lower viscosity and is useful at lower temperatures than either the ether or phosphate components separately. Similar use of the monochloro- or dichloro-ether have still greater advantages in this respect. However, with decreasing chlorine content of the chlorinated diphenyl ether, the fire resistance of the fluid decreases. On the other hand, the fire resistance of the fluid is increased by increasing chlorine content of the ether component, so that 50% hexachlorodiphenyl ether and 50% tricresyl phosphate provide a fluid which is extremely fire resistant although such a fluid is too viscous at room temperature for many applications. However, it is useful, for example, as an air compressor lubricant. Further, most of the chlorinated diphenyl ethers taken alone, and even mixtures of chlorinated diphenyl ethers containing various amounts of chlorine, and mixtures of various diphenyl ether isomers containing the same chlorine content, tend to crystallize in whole or in part, thus substantially limiting their utility when employed separately. Hence the chlorinated diphenyl ethers alone are not suitable, particularly for low temperature operations, whereas when employed in combination with the phosphate esters hereof, and particularly when employing certain mixtures thereof as described above, the resulting composition remains liquid and has sufficiently low viscosity to permit use of such mixtures at relatively low temperatures of 0° F. and below, while at the same time such mixtures retain the good lubricity of the phosphate esters.

It is particularly noteworthy that compositions according to the invention containing clorinated diphenyl ethers having a given chlorine content have lower viscosity and lower pour point and cloud points generally than compositions of the above Patent 3,136,726 containing chlorinated diphenyls of corresponding chlorine content. This is particularly significant for chlorinated diphenyl ethers of lower chlorine content, e.g., having an average of about 1 to 4 chlorine atoms, in comparison with compositions of the above patent containing corresponding amounts of chlorine in the chlorinated diphenyls of such compositions.

As previously noted, viscosity index improvers can be incorporated in the invention compositions, although not necessarily. Thus, to a mixture of phosphate ester and chlorinated diphenyl ether according to the invention, can be added suitable polyalkyl methacrylates, e.g., those marketed by Rohm and Haas Company as "Acryloid." These materials have varying molecular weight and viscosity. In general, the polymerized alkyl methacrylates suitable for use in the invention composition or fluid contain from about 2 to about 18, preferably about 4 to about 10 carbon atoms in the alkyl group, and have a molecular weight within the range of about 2,000 to about 20,000 and an average molecular weight within the range of about 3,000 to about 15,000. Usually a minor proportion, e.g., about 0.2 to about 10% by weight, of such poly alkyl methacrylate is employed.

The following are examples of practice of the invention:

EXAMPLE 1

The following are blends or mixtures of chlorinated diphenyl ethers with triaryl phosphates according to the invention:

TABLE I (1) 50% monochlorodiphenyl ether, 50% tricresyl phosphate
(2) 50% dichlorodiphenyl ether, 50% tricresyl phosphate
(3) 50% trichlorodiphenyl ether, 50% tricresyl phosphate
(4) 50% tetrachlorodiphenyl ether, 50% tricresyl phosphate
(5) 50% pentachlorodiphenyl ether, 50% tricresyl phosphate
(6) 50% hexachlorodiphenyl ether, 50% tricresyl phosphate The viscosity of the various mixtures noted above decreases and the product becomes more useful at lower temperatures, e.g., of the order of 0° F. and below, proceeding from composition 6 to composition 1, and the fire resistance increases proceeding from mixture 1 to mixture 6. Fluid mixture 4 is particularly useful for a variety of purposes. Thus, composition 6 can be selected for use where the fire hazard is extreme, for example, with high pressure air compressors, and mixtures 1 to 3 can be selected where start-up at relatively low temperatures is required by provision of a fluid of relatively low viscosity at such low temperatures. Thus, for example, a fluid of composition 4 above has the following properties:

Viscosity at 100° F. _____ centistokes__ 34.8
Viscosity at 210° F. _____ do____ 3.82
Cloud point _____ None
Pour point _____ ° F__ +15

EXAMPLE 2

The following mixtures were prepared:

*Composition 7*

Percent by weight
Cresyldiphenyl phosphate _____ 85
Dichlorodiphenyl ether _____ 15

*Composition 8*

Percent by weight
Diphenyl m-chlorophenyl phosphate _____ 50
Monochlorodiphenyl ether _____ 50

The above mixtures were each pump tested at a pump inlet temperature of 350° F. and 3,000 p.s.i. At the end of 2½ hours of pumping there was no indication that either of the fluids had deteriorated. The above compositions had the following properties:

tions according to the invention, and compositions 10 and 13 contain chlorinated biphenyls as disclosed in Patent No. 3,136,726.

TABLE II

| Composition | Components | Percent by Weight | Cloud Point | Pour Point, °F. | Viscosity (centistokes) 100° F. | Viscosity (centistokes) 210° F. | Viscosity index | Shell–4 ball wear test-diam.(mm.) |
|---|---|---|---|---|---|---|---|---|
| 9 | Tricresyl phosphate<br>Tetrachlorodiphenyl ether | 17<br>83 | | +5 | 34.7 | 3.29 | | |
| 10 | Tricresyl phosphate<br>Chlorinated biphenyl (average of 4 chlorine atoms per molecule) | 17<br>83 | | +17 | | | | |
| 11 | Tricresyl phosphate<br>Hexachlorodiphenyl ether | 60<br>40 | None | 5 | 63.2 | 4.82 | −22 | 0.58 |
| 12 | Cresyl diphenyl phosphate<br>Dichlorodiphenyl ether | 50<br>50 | −34° F. | −40 | 8.97 | 2.11 | | |
| 13 | Di(2-ethylhexyl)phenyl phosphate<br>Chlorinated biphenyl (average of 3 chlorine atoms per molecule) | 40<br>60 | None | −50 | 12.4 | 2.40 | −44 | 0.39 |
| 14 | Di(2-ethylhexyl)phenyl phosphate<br>Trichlorodiphenyl ether | 40<br>60 | None | −65 | 9.09 | 2.13 | +8 | 0.39 |
| 15 | 2-ethylhexyl diphenyl phosphate<br>Tetrachlorodiphenyl ether | ¹41.3<br>¹55.3 | None | −35 | 15.7 | 2.68 | −74 | |

¹ Parts by weight.

| | Compositions | |
|---|---|---|
| | 7 | 8 |
| Pour point before and after test, °F | −65 | −65 |
| Acid number: | | |
| Before test | 0.05 | 0.04 |
| After test | 0.06 | 0.36 |
| Viscosity of the fluid pumped (centistokes) before test at— | | |
| 100° F | 4.73 | 5.82 |
| 210° F | 1.47 | 1.70 |

A Shell 4-ball wear test was carried out with the above fluid composition 7 at 400° F. The test was carried out at 1,200 r.p.m. for 1 hour using a 40 kgm. load for (a) steel-on-steel and (b) steel-on-naval brass, the steel being 52100 steel.

The same 4-ball wear test was carried out with fluid composition 8 above under the same conditions as noted above, for steel-on-steel.

The results of these tests are noted below:

*Composition 7*

Scar diameter in mm.
Steel-on-steel _____ 1.65
Steel-on-brass _____ 2.98

*Composition 8*

Scar diameter in mm.
Steel-on-steel _____ 1.11

EXAMPLE 3

The fluid compositions 9 through 16 each having the composition noted in the table below were prepared and data with respect to their properties are set forth in the table below: A Shell 4-ball wear test was run for fluid compositions 11, 13 and 14 at 75° C. for 1 hour at 600 r.p.m. using a 40 kgm. load for steel-on-steel, the results of such tests being shown in the last column of the table. Compositions 9, 11, 12, 14, 15 and 16 are fluid composi- Table II above shows that the fluid compositions of the invention, 9, 11, 12, 14 and 15, particularly those containing chlorinated diphenyl ethers having about 4 chlorine atoms and less, e.g., compositions 12, 14 and 15, have low temperature characteristics as exemplified by their relatively low pour points, which permit their use in certain instances at temperatures of the order of about −40° F.

Comparing invention compositions 9 and 14, with the corresponding compositions 10 and 13, respectively, of the prior art, which include chlorinated biphenyls having corresponding chlorine content to the chlorinated diphenyl ethers of invention fluids 9 and 14, it is noted that invention composition 9 has a lower pour point than prior art composition 10, and that composition 14 of the invention has lower viscosity, lower pour point and a higher viscosity index as compared to prior art composition 13.

EXAMPLE 4

Compositions 16 to 19 were prepared each having the composition noted in Table III below, and their viscosity and condition after overnight storage at about −30° F. noted in the table below:

TABLE III

| Composition | | Temp., °F. | Viscosity in Centistokes | Condition After Overnight Storage in Freezer at about 30° F. |
|---|---|---|---|---|
| 16 | 50% dichlorodiphenyl ether+50% cresyl diphenyl phosphate | 0 | 514 | Hazy pourable liquid. |
| 17 | 50% trichlorodiphenyl ether+50% cresyl diphenyl phosphate | 0 | 1,890 | Do. |
| 18 | 33.3% trichlorodiphenyl ether+33.3% dichlorodiphenyl ether+33.3% cresyl diphenyl phosphate | 0 | 667 | Cloudy pourable liquid. |
| 19 | 60% dichlorodiphenyl ether+40% tricresyl phosphate | 0 | 1,010 | Clear liquid. |

From Table III above it is noted that all of the compositions 16 to 19 of the invention had a relatively low viscosity at 0° F. varying from a high of 1,890 centistokes for composition 17 down to only 514 for composition 16 containing dichlorodiphenyl ether and cresyl diphenyl phosphate. Note further that after storage overnight in a freezer at the low temperature of −30° F. all of the compositions 16 to 19 were still pourable liquids.

EXAMPLE 5

Compositions 20 to 22 were prepared having the compositions set forth in Table IV below, and the viscosity at various temperatures, cloud point and pour point for the various compositions are set forth in Table IV.

TABLE IV

| Composition | Components | Kinematic Viscosity in Centistokes | | | Cloud Point | Pour Point, °F. |
|---|---|---|---|---|---|---|
| | | 0° F. | 100° F. | 210° F. | | |
| 20 | 50% trichlorodiphenyl ether+50% cresyl diphenyl phosphate. | 1,190 | 12.2 | 2.44 | None | −20 |
| 21 | 50% Aroclor 1242 (a chlorinated biphenyl containing 42% chlorine and an average of about 3 chlorine atoms per molecule)+50% cresyl diphenyl phosphate. | 8,630 | | | | −15 |
| 22 | 43% tricresyl phosphate+57% pentachlorodiphenyl ether. | | 84.5 | 4.90 | | |

From Table IV above it is seen that composition 20 of the invention containing trichlorodiphenyl ether has a much lower viscosity, that is 1,190 centistokes at 0° F., as compared to the 8,630 centistokes of composition 21 according to the prior art Patent 3,136,726 and containing a trichlorinated biphenyl. Further, composition 20 of the invention has a lower pour point as compared to the aforementioned prior art composition 21.

From the foregoing, it is seen that the invention provides novel and improved fluid compositions particularly useful as hydraulic fluids, lubricants, coolants and the like. Mixtures according to the invention have the following characteristics:

(1) High fire resistance particularly where the chlorinated diphenyl ether contains at least 40% chlorine by weight or where a large proportion of phosphate ester is used to off-set the lower chlorine content.
(2) Good to excellent thermal stability.
(3) Good to excellent oxidative stability.
(4) Very good lubricity.
(5) Wide liquid range with relatively low pour point and cloud point.
(6) Improved viscosity at low temperature of the order of 0° F. and below.
(7) Compatibility with metals used in construction of hydraulic systems operating over wide temperature ranges.
(8) The hydraulic fluids of the invention are versatile and relative proportions of the components can be selected and varied to achieve the properties desired for the intended application.

While I have described particular embodiments of my invention for the purpose of illustration, it should be understood that various modifications and adaptations thereof may be made within the spirit of the invention, as set forth in the appended claims.

I claim:
1. A fire resistant hydraulic fluid and lubricant consisting essentially of a mixture of about 10 to about 90% by weight of a phosphate ester having the formula

$$R'O-\underset{\underset{OR''}{|}}{\overset{\overset{OR}{|}}{P}}=O$$

wherein R is a radical selected from the group consisting of phenyl, cresyl and xylyl, and R' and R'' are radicals selected from the group consisting of phenyl, cresyl, xylyl, and an alkyl radical of from about 4 to about 12 carbon atoms, and about 10 to about 90% by weight of a chlorinated diphenyl ether containing in the range from about 1 to about 6 chlorine atoms per molecule and a combined chlorine content in the range of about 15 to about 59% by weight.

2. A fire resistant hydraulic fluid and lubricant as defined in claim 1 wherein said chlorinated diphenyl ether consists essentially of a mixture of chlorinated diphenyl ethers having an average of about 4 chlorine atoms per molecule, and a combined chlorine content of about 45 to about 50% by weight.

3. A fire resistant hydraulic fluid and lubricant consisting essentially of a mixture of about 10 to about 90% by weight of tricresyl phosphate and about 10 to about 90% by weight of a chlorinated diphenyl ether containing in the range from about 1 to about 6 chlorine atoms per molecule and a combined chlorine content in the range of about 15 to about 59% by weight.

4. The composition as defined in claim 3, consisting essentially of about 10 to about 70% by weight of tricresyl phosphate and about 30 to about 90% by weight of said chlorinated diphenyl ether, said ether containing in the range from about 1 to about 4 chlorine atoms per molecule.

5. A fire resistant hydraulic fluid and lubricant consisting essentially of a mixture of about 10 to about 90% by weight of tricresyl phosphate and about 10 to about 90% by weight of a mixture of chlorinated diphenyl ether having an average of about 4 chlorine atoms per molecule, and a combined chlorine content of about 45 to about 50% by weight.

6. A fire resistant hydraulic fluid and lubricant consisting essentially of a mixture of about 10 to about 90% by weight of cresyl diphenyl phosphate and about 10 to about 90% by weight of a chlorinated diphenyl ether containing in the range from about 1 to about 6 chlorine atoms per molecule and a combined chlorine content in the range of about 15 to about 59% by weight.

7. The composition as defined in claim 6, consisting essentially of about 10 to about 70% by weight of cresyl diphenyl phosphate and about 30 to about 90% by weight of said chlorinated diphenyl ether, said ether containing in the range from about 1 to about 4 chlorine atoms per molecule.

8. A fire resistant hydraulic fluid and lubricant consisting essentially of a mixture of about 10 to about 90% by weight of di-(2-ethyhexyl)phenyl phosphate and about 10 to about 90% by weight of a chlorinated diphenyl ether containing in the range from about 1 to about 6 chlorine atoms per molecule and a combined chlorine content in the range of about 15 to about 59% by weight.

9. The composition as defined in claim 8, including about 10 to about 70% by weight of di(2-ethyhexyl)phenyl phosphate and about 30 to about 90% by weight of said chlorinated diphenyl ether, said enter containing in the range from about 1 to about 4 chlorine atoms per molecule.

10. A fire resistant hydraulic fluid and lubricant consisting essentially of a mixture of about 10 to about 90% by weight of a phosphate ester having the formula $$R'O-\underset{\underset{OR''}{|}}{\overset{\overset{OR}{|}}{P}}=O$$

wherein R is a radical selected from the group consisting of phenyl, cresyl and xylyl, and R' and R'' are radicals selected from the group consisting of phenyl, cresyl, xylyl, and an alkyl radical of from about 4 to about 12 carbon atoms, and about 10 to about 90% by weight of a chlorinated diphenyl ether containing in the range from about 1 to about 6 chlorine atoms per molecule and a combined chlorine content in the range of about 15 to about 59% by weight, and about 0.2 to about 10% by weight of a poly alkyl methacrylate in which the alkyl radical has from about 2 to about 18 carbon atoms and having a molecular weight within the range of about 2,000 to about 20,000.

References Cited

UNITED STATES PATENTS 3,136,726   6/1964   Moreton _____ 252—78 X

FOREIGN PATENTS 1,327,189   5/1963   France.

LEON D. ROSDOL, *Primary Examiner.*

S. D. SCHWARTZ, *Assistant Examiner.*